United States Patent Office 3,657,189
Patented Apr. 18, 1972

3,657,189
POLYMERIZATION OF A GASEOUS
FORMALDEHYDE
Shinichi Ishida, 22–4, Denenchofu-5-chome, Tokyo,
Japan; Norimasa Fujita, 23, Tatemachi, Kanagawa-ku,
Yokohama, Japan; Yoshisada Oshima, 14–3–305,
Hatanodai-6-chome, Shinagawa-ku, Tokyo, Japan; and
Teturo Tanaka, 181, Kamiodanaka; and Mitito Hiruta,
819, Chitose, both of Kawasaki-shi, Japan
Filed Aug. 28, 1970, Ser. No. 67,837
Claims priority, application Japan, Sept. 8, 1969,
44/70,543
Int. Cl. C08g 1/02
U.S. Cl. 260—67 FP
3 Claims

ABSTRACT OF THE DISCLOSURE

Gaseous formaldehyde monomer rapidly polymerizable at a temperature lower than the ceiling temperature of the polymer produced is polymerized in a liquid polymerization medium by blowing the monomer into a liquid polymerization zone through a gas passage heated to a temperature higher than the ceiling temperature of the polymer, and keeping a gas blowing nozzle connecting to the polymerization zone and its neighbor at a temperature higher than the boiling point of the polymerization medium but lower than the thermal decomposition temperature of the monomer.

---

This invention relates to a method for polymerization of a gaseous monomer which is readily polymerized in a liquid polymerization medium at a temperature lower than the ceiling temperature of the polymer produced. When a gaseous monomer, which is liable to undergo scaling when cooled to a temperature lower than the ceiling temperature of the polymer produced, is blown into a liquid polymerization zone maintained at a temperature lower than the ceiling temperature, there occurs a temperature gradient between the gas side kept at higher than the ceiling temperature and the polymerization zone side kept at lower than the ceiling temperature, and as a result, the scaling takes place inevitably at the lower temperature side, and to an apparatus for blowing gaseous monomers into a polymerization vessel.

For example, it is known that the polymerization of gaseous formaldehyde in the liquid polymerization medium is efficiently carried out at a temperature lower than 80° C., but not efficiently higher than 100° C., because the ceiling temperature of formaldehyde polymer is about 127° C. However, in the case where polymerization of gaseous formaldehyde in the liquid polymerization medium is carried out at a temperature lower than 80° C., undesirable polymerization takes place often on the wall of the polymerization zone because of the above-mentioned temperature gradient, and scale made by polymer deposits onto the wall considerably.

Particularly, scale deposition is remarkable at a gas blowing nozzle part connecting to the polymerization zone and its neighbor with the elapse of time, and often the nozzle is clogged. Consequently, it becomes impossible to continue the polymerization. Heretofore, some attempts have been made to avoid the scale deposition by diluting the gaseous monomer with such an inert gas as toluene vapour or nitrogen gas, but it is not satisfactory from an industrial point of view.

As a result of our investigation, we have found that the problem of the scale deposition is solved by blowing a gaseous monomer, which is readily polymerized in a liquid polymerization medium at a temperature lower than the ceiling temperature of the polymer produced, into a specific polymerization zone, and the effect of the present invention is only obtained by directly blowing the gaseous monomer into a polymerization medium through a nozzle B as shown in FIG. 1 but not obtained by blowing the gaseous monomer onto a surface of a polymerization medium through a nozzle A as shown in FIG. 1.

Now, the present invention and the conventional methods will be explained referring to the accompanying drawings.

Figure 1:
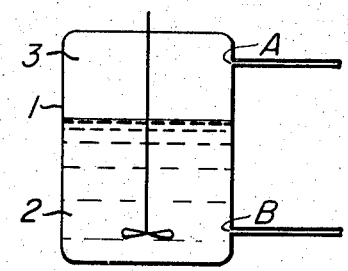
FIG. 1 is a schematic view illustrating a position for blowing a gaseous monomer into a polymerization zone.

In FIG. 1, numeral 1 shows a polymerization vessel, 2 a liquid phase section in the vessel and 3 a gaseous phase section therein. In the liquid phase section 2 of the polymerization vessel, a polymerization medium containing a catalyst is filled, and the gaseous phase section 3 of the polymerization vessel consists of a gas phase having a vapour pressure corresponding to that of the medium. It is ordinarily thinkable to connect a gas blowing nozzle to either the gaseous phase section 3, as shown by A, or the liquid phase section 2, as shown by B.

In any case, it is necessary to heat the gaseous monomer to a temperature higher than the ceiling temperature of the polymer produced.

However, the polymerization vessel itself is never at such a high temperature, and consequently the nozzle A or B is always at a temperature lower than the ceiling temperature and the temperature almost corresponds to the temperature of the polymerization medium.

In such cases, we have found that the scale deposition caused by polymerization always takes place at the nozzle part and its neighbor and the nozzle is clogged within a short time, and the clogging proceeds faster in the nozzle A than in the nozzle B. Further, it is found that the scale deposits in a larger amount at the nozzle A than at the nozzle B.

Even though the scale deposition or clogging is decreased by connecting the nozzle to the vessel as shown by B, the scale deposition and clogging still proceed even in this case, and consequently it is impossible to continue the polymerization stably for a long time.

We have made intensive studies and efforts to overcome said drawbacks and have invented a new method and an apparatus for blowing the gaseous monomer into the polymerization zone, in which the polymerization is stably operable for a prolonged period of time.

First of all, we have found that, when a gas blowing nozzle part and its neighbor are maintained at a temperature above the boiling point of a polymerization medium, no scale deposition takes place.

That is, it means that no polymerization takes place in a boiling medium even at a temperature below the ceiling temperature of the polymer produced. For example, formaldehyde, which polymerizes readily at lower than 80° C., does not polymerize in boiling diethylether (B.P. 34.5° C.). However, the polymerization takes place readily and rapidly in n-hexane even at the same temperature (i.e. 34.5° C.), so long as the n-hexane does not boil. Same phenomena are confirmed even in the presence of a polymerization catalyst. Therefore, if the nozzle part and its neighbor are kept at a temperature above the boiling point of the polymerization medium used, scale deposition never takes place at the nozzle part and its neighbors.

The present invention has been completed on the basis of such findings, and is to provide a method for polymerizing a gaseous monomer, which is readily polymerizable at a temperature lower than the ceiling temperature of the polymer, in a liquid polymerization medium without causing the scale deposition, characterized by blowing the monomer into a polymerization zone through a gas passage heated to a temperature higher than a ceiling temperature of the polymer produced but lower than a thermal decomposition temperature of the monomer, for example, lower than 600° C. in case of formaldehyde, lower than 500° C. in case of paraxylene, and lower than 500° C. in case of vinylidene cyanide, and keeping a gas blowing nozzle part connecting to the polymerization zone at a temperature higher than a boiling point of the polymerization medium used but lower than the thermal decomposition temperature of the monomer.

When the temperature of the passage is higher than the temperature of the nozzle part, the nozzle part must be made to have the same temperature as that of the passage, but it is not preferable from either economical point of view or heat removal of the polymerization system to provide an unnecessarily higher temperature. For example, in the case of the polymerization of formaldehyde, preferable temperature of the nozzle part is from the boiling point of a polymerization medium used to 200° C.

In the case of the production of polyparaxylylene, where polymerization is carried out by thermally decomposing paraxylene or diparaxylylene at a temperature of from 800° C. to 1000° C. to produce reactive divalent radicals, passing the radicals through the gas passage maintained at a temperature higher than the ceiling temperature of polyparaxylene but lower than 400° C., and blowing them through a gas blowing nozzle into an inert organic medium maintained at 50° C. or higher, polymer can be obtained by maintaining a temperature of the nozzle part and its neighbor at a temperature higher than the boiling point of said inert organic medium without any scale deposition around the nozzle part and its neighbor.

Gaseous vinylidene cyanide is also effectively polymerized without causing the scale deposition in the same way as in the case of formaldehyde or paraxylene.

In this invention, the gaseous monomer used as a raw material includes formaldehyde, vinylidene cyanide, paraxylene and the like and may be diluted with such an inert gas as toluene vapour or nitrogen gas and supplied to the polymerization zone.

In this invention, any polymerization medium, which is usually used in polymerization of the gaseous monomer, can be used. For example, aliphatic hydrocarbons, such as hexane, heptane, octane, etc.; alicyclic hydrocarbons, such as cyclohexane, methyl cyclohexane, etc.; aromatic hydrocarbons and their derivatives such as benzene, toluene, xylene, ethylbenzene, etc.; their halides, such as chloroform, tetrachloroethane, chlorobenzene, etc.; ethers such as diethyl ether, methylethyl ethers, etc.; cyclic ethers such as dioxane, tetrahydrofuran; esters such as ethyl acetate, methylene diacetate, etc.; nitriles such as acetonitrile, propionitrile, etc.; further acid anhydrides such as acetic anhydride, propionic anhydride, are used alone or in combination.

Any catalyst, which is usually used in polymerization of the gaseous monomer, can be used in the present invention, and the polymerization according to the present invention never restrict, the kind of catalyst.

Pressure of the gaseous monomer at the nozzle part must be higher than the static pressure, which corresponds to a depth of the polymerization medium at the nozzle part in the polymerization vessel, and practically, a pressure enough to prevent a back flow of the polymerization medium from the nozzle to the gas passage, that is, to allow the gaseous monomer continuously and stably to lead to the medium in the polymerization vessel, is necessary. The pressure depends also up the size of the nozzle, but can be calculated from the static pressure corresponding to the depth of the medium and pressure loss at the nozzle part. Practically, a presusre, which is about 0.5–1 kg./cm.$^2$ higher than the calculated static pressure, is sufficient.

Figure 2:
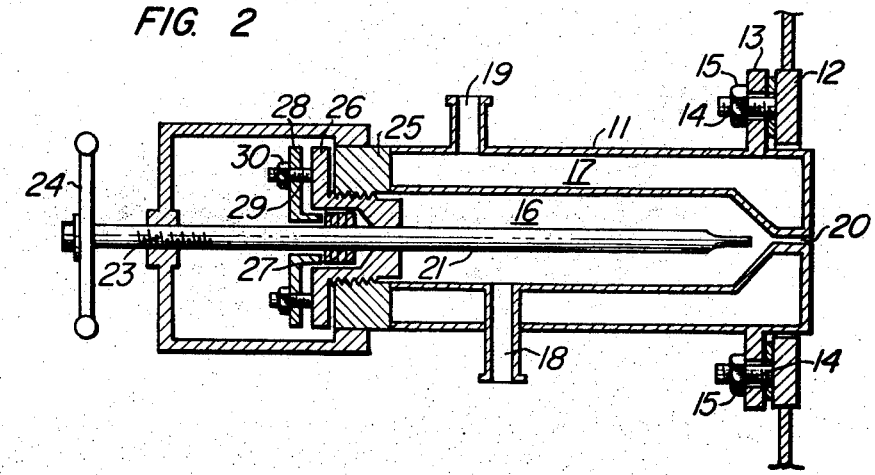
FIG. 2 is a vertical cross-sectional view of a gas passage and gas blowing nozzle part.

In FIG. 2, a vertical cross-sectional view of a gas passage and gas blowing nozzle for carrying out the present invention preferably is shown. Numeral 11 is a body of an apparatus, 12 a vessel wall of the polymerization vessel. The body 11 is fixed at said vessel wall by means of a flange 13 provided at the tip part of the body, using stud bolts 14 and nuts 15 fixed to the outer side of said vessel wall 12.

The body 11 has a monomer gas passage 16 along its center and a heating jacket 17 around the passage 16. Numeral 18 is an inlet pipe for introducing the gaseous monomer, 19 a medium inlet for leading a medium for heat to the heating jacket 17, and 20 a nozzle for blowing the gaseous monomer from said passage 16 into the polymerization vessel. As shown in the drawing, the heating jacket 17 is provided so that it can cover even the tip of said nozzle 20. A valve rod 21 is provided along the center of the body to open or close said nozzle 20. The valve rod 21 is engaged with the rear part of the body by means of a screw part 23 provided near the rear end of the valve rod, and is moved forwards or backwards by rotating a handle 24 provided at the rear end of the valve rod to open or close the nozzle 20. Numeral 25 is a stuffing box mounting, which forms a part of the body, 26 a stuffing box, 27 a gland packing, and 28 a ring for fixing the gland packing. Said ring 28 for fixing the gland packing is fixed to the stuffing box means of stud bolts 29 and nuts 30 fixed to the stuffing box. In this manner, the gland packing 27 seals any clearance around the valve rod 21 to prevent a leakage of the gaseous monomer from the passage 16.

In this apparatus, a medium for heat is introduced into the heating jacket 17 from the inlet 19, and the entirety of the gas passage 16 and nozzle part 20 and its neighbor are heated by it. Then, the handle 24 is turned toward the opening direction of the nozzle 20 to lead the gaseous monomer into the passage 16 from the inlet 18. The gaseous monomer is blown into the polymerization vessel containing polymerization medium form the nozzle 20. At that time, the generation of scale is repressed by keeping the nozzle and its neighbor at a temperature higher than the boiling point of the polymerization medium, and the polymerization can be continued stably for a long period of time.

Figure 3:
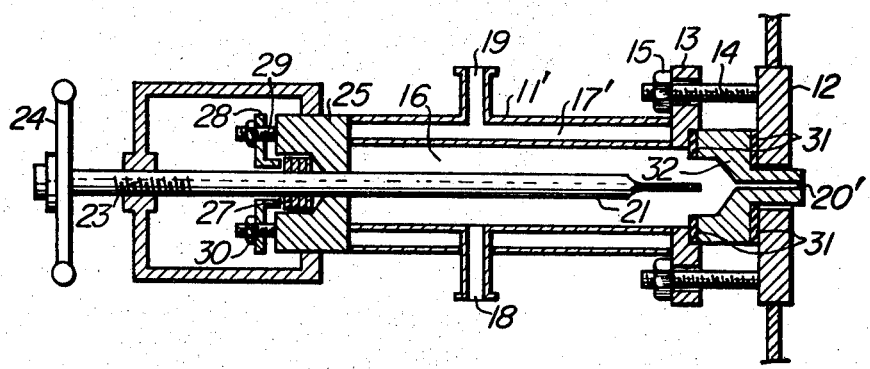
FIG. 3 is a vertical cross-sectional view of a conventional gas passage and gas blowing nozzle part.

The vertical cross-sectional view of the conventional gas passage and gas blowing nozzle is shown in FIG. 3.

The structure of the apparatus shown in FIG. 3 is almost similar to that as shown in FIG. 2, except that a heating jacket 17′ does not cover nozzle 20′. The identical parts are represented by the same numerals as in FIG. 2. In FIG. 3, numeral 31 is a heat-insulating packing.

According to the structure of the apparatus as shown in FIG. 3, the nozzle 20′ connecting to the polymerization vessel is thermally isolated from the gas passage 16 by a Teflon block 32 and it has been experimentally confirmed that said nozzle 20′ does not reach a temperature higher than the boiling point of the polymerization medium because nozzle 20′ is not heated by the heating jacket 17′, and accordingly when the polymerization of the gaseous monomer is carried out by using such apparatus, it is impossible to continue the polymerization stably for a long period of time because of scale deposition.

EXAMPLE

Gaseous formaldehyde having a purity of 99.9% or higher was polymerized at 45° C., with stirring, in n-hexane containing 3.0 ml./l. of di-n-butyl tin dilaurate under the following conditions, using a polymerization vessel as shown in FIG. 1.

Tank capacity: 400 l.
Solvent charge: 280 l.
Gas blowing pressure: 1.5 kg./cm.$^2$ gage Gas flow rate: 12 kg./hr.
Nozzle size: 3 mm. diameter The gaseous formaldehyde was blown into the vessel through the apparatus shown in FIG. 2 at the nozzle position B of FIG. 1, and a time till the nozzle was clogged was measured.

For comparison, the gas was blown into the vessel at the nozzle position A of FIG. 1, using the same apparatus as shown in FIG. 2.

In the similar manner, the gas was blown into the vessel, using the apparatus as shown in FIG. 3, at the nozzle position A or B.

The results are shown in the following table.

|  | Temp. of gas passage (° C.) | Temp. of nozzle (° C.) | Time (hr.) |
|---|---|---|---|
| Apparatus of Fig. 2: | | | |
| Blowing into liquid phase, nozzle position B (present invention) | 130 | ca. 70 | 150 |
| Blowing into gaseous phase, nozzle position A (comparison) | 130 | 110 | 30 |
| Apparatus of Fig. 3: | | | |
| Blowing into liquid phase, nozzle position B (comparison) | 130 | 45 | 3 |
| Blowing into gaseous phase, nozzle position A (comparison) | 130 | 45 | 2 |

We claim:

1. A method for polymerizing gaseous formaldehyde in a liquid polymerization medium at a temperature lower than the ceiling temperature of the polymer produced, which comprises blowing the gaseous formaldehyde from a gas blowing nozzle into a liquid polymerization medium through a gas passage heated to a temperature higher than the said ceiling temperature, and keeping the gas blowing nozzle connecting to the polymerization zone at a temperature higher than the boiling point of the liquid polymerization medium.

2. A method according to claim 1, wherein the temperature of the nozzle is from the boiling point of the polymerization medium to 200° C.

3. A method according to claim 1 wherein the temperature of the nozzle is from the boiling point of the polymerization medium to 600° C.

References Cited

UNITED STATES PATENTS 3,172,736    3/1965    Gee et al. _____ 260—67 FP X
3,458,479    7/1969    Lugo et al. _____ 260—67 FP

OTHER REFERENCES

Encyclopedia of Polymer Science and Technology, vol. 3 (1965). John Wiley & Sons, Inc. N.Y. pp. 59–60.

WILLIAM H. SHORT, Primary Examiner

L. M. PHYNES, Assistant Examiner

U.S. Cl. X.R.

260—88.7, 93.5; 23—285

UNITED STATES PATENT OFFICE
CERTIFICATE OF CORRECTION

Patent No. 3,657,189   Dated April 18, 1972

Inventor(s) Shinichi Ishida et al

It is certified that error appears in the above-identified patent and that said Letters Patent are hereby corrected as shown below:

Col. 1, before line 10, insert --assignors to Asahi Kasei Kogyo Kabushiki Kaisha, Osaka, Japan--.

Signed and sealed this 28th day of November 1972.

(SEAL)
Attest:

EDWARD M. FLETCHER, JR.
Attesting Officer

ROBERT GOTTSCHALK
Commissioner of Patents